UNITED STATES PATENT OFFICE.

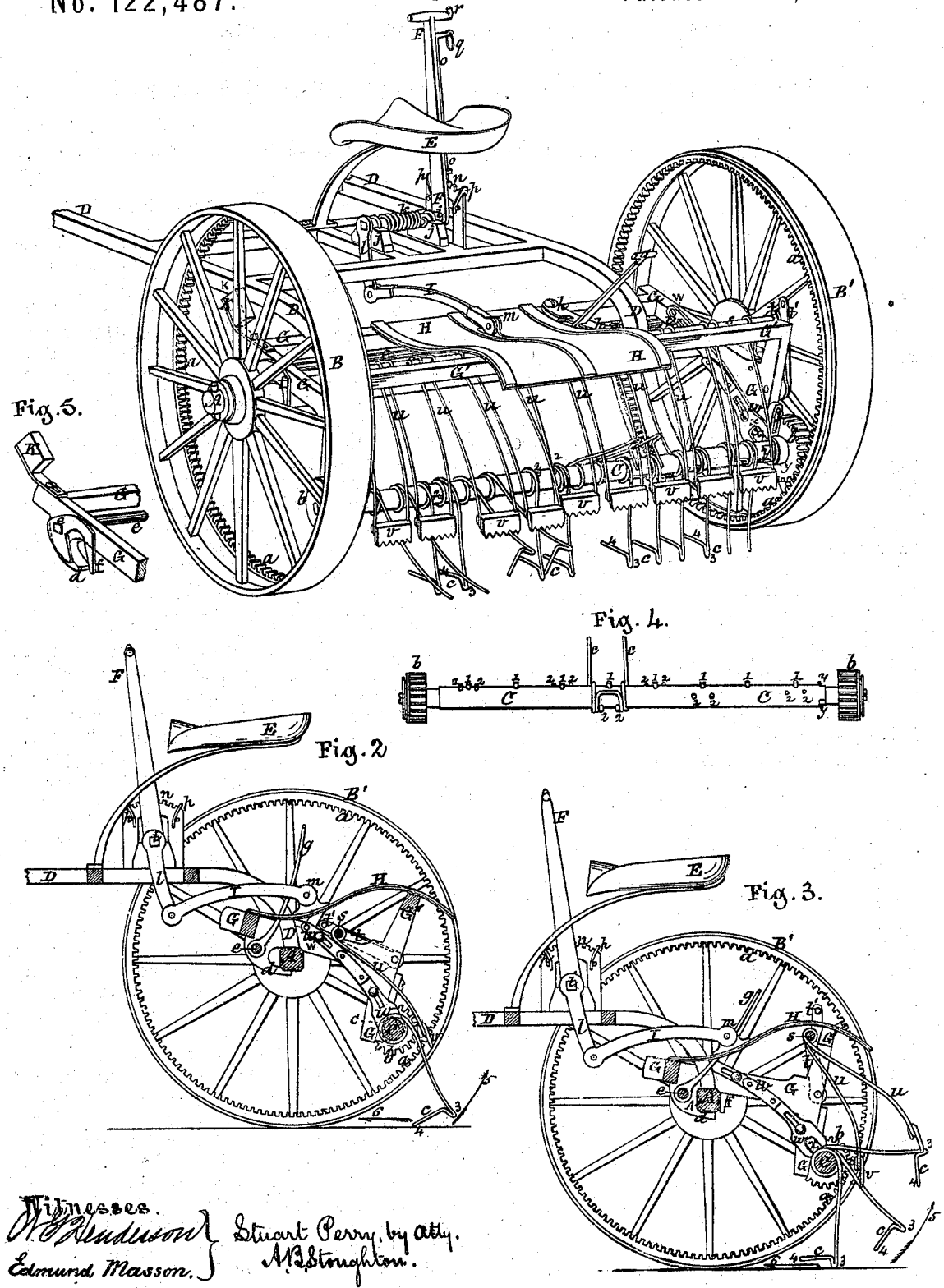

STUART PERRY, OF NEWPORT, NEW YORK.

IMPROVEMENT IN COMBINED HAY-TEDDERS AND RAKES.

Specification forming part of Letters Patent No. 122,487, dated January 2, 1872.

*To all whom it may concern:*

Be it known that I, STUART PERRY, of Newport, in the county of Herkimer and State of New York, have invented certain new and useful Improvements in Combined Hay-Tedders and Hay-Rakes; and that the following is a full, clear, and exact description of the same, reference being had to the accompanying drawing making a part of this specification, in which—

Figure 1 represents, in perspective, the machine as arranged for tedding, turning, or making the hay. Fig. 2 represents a section through the machine as it appears when arranged for raking the hay into windrows. Fig. 3 represents a section through the machine when arranged for tedding, as shown in Fig. 1. Figs. 4 and 5 represent details of the machine that will be hereafter more particularly referred to.

Similar letters of reference where they occur in the separate figures denote like parts of the machine in the drawing.

The machine to which my invention pertains is designed for both the turning or tedding of hay, and also, by a change of some of its operative parts, of raking up the hay into windrows while the operator rides upon the machine.

To enable those skilled in the art to make and use my invention, I will proceed to describe the same with reference to the drawing.

The main axle A, which is stationary, is supported in the two carrying and driving wheels B B', which are provided with internal cogged rims *a a* for driving the tedder-shaft C through the pinions *b b*, the drums or hubs of said pinions being furnished with ratchet-and-pawl mechanism that causes said pinions to drive the shaft positively when the machine is advanced over the field, and to slip thereon when turning the machine around or backing it. The shafts D are firmly secured to the axle A, and are bent upward and forward, as seen in the drawing, and upon these shafts or the shaft-frame is placed the driver's seat E, and the lever F and its appliances for raising, lowering, or adjusting the height at which the fingers *c c c* shall work, whether as tedders or as rakers, as the case may be. The main frame G, though resting on and carried by the main axle A, is not permanently united to said axle, but has a longitudinal motion thereon for throwing the pinions *b b* out of and into gear with the cogged rims *a a*, as the particular use of the machine may require. On the under side of the main frame, and forward of the main axle, are curved or hooked bearers *d*, which partially take in or embrace the main axle, and through these bearers, or the projections in which they are formed, passes a through shaft, *e*, which has upon its extreme ends outside of the main frame hooked lugs or ears *f*, which take over and embrace the upper part of the main axle A. To the shaft *e* is attached a lever, *g*, which rises up so as to be readily grasped and operated by the driver in his seat E, and by which lever the driver may move the main frame forward or backward to take the pinions out of or to put them into gear with the driving-wheels, as may be required in changing the machine from a tedder to a rake, and vice versa, and a notched keeper, *h*, is pivoted to the main frame, and extends rearward, so that the lever may be firmly held in either of its changed positions. H is a shield to protect the driver against any pieces or parts of the teeth *c* which may accidentally become broken or detached, and thrown upward and forward by their rapid rotation when tedding the hay. The lever F is attached to and projects upward from a horizontal shaft, *i*, supported in bearers *j j*, and around which a spring, *k*, is coiled, which becomes compressed when the lever F is moved forward, and reacts when moved in a contrary direction, and thus aids to raise up or balance the tedders or rake, as the case may be. To the opposite end of the shaft *i* from where the lever F is attached to it there is attached a crank-arm, *l*, to the outer end of which one end of a link, l, is pivoted, the other end of said link being pivoted to a lug, *m*, which is on the main frame, so that by this lever and its connections the main frame may be moved about or around the axle A as a center, while the other lever *g* moves said frame forward and backward on the axle, as above described. Near the base of the lever F there is a curved toothed arc, *n*, into any one of the teeth or recesses of which a sliding bolt, *o*, on the lever may drop to hold said lever and the main frame in a fixed or adjusted position, and upon this arc are also arranged movable guards *p p*, to limit and define the extent of motion of said lever. And when it is desired to allow the lever F to have free and unrestrained motion within working limits—as, for instance, when the main frame rises and falls as the teeth c move over or in contact with the inequalities in the ground—then the ring q of the bolt o may be slipped over the arm r of the lever F, and thus be prevented from dropping into any of the recesses of the arc n. The shaft C, carrying the teeth c and the pinions or spurs b b, is hung in the downward-projecting arms of the main frame, and revolves in suitable bearings thereon when the machine is a tedder. The teeth c c are made of stout but springy wire, and in pairs, as shown more distinctly in Fig. 4—that is, one piece of wire, suitably bent, as therein shown, forms two teeth. Two separate series of pins (or preferably screws) are arranged longitudinally on this shaft C, one series—viz., that composed of two pins or screws, 2—is arranged spirally around said shaft, and are designed for catching and holding the teeth c in a spiral line, and in that position allowing them to revolve, so that some of the teeth are constantly taking, carrying up, and turning over the hay. The other series, 1, are single pins or screws, and are arranged in a straight line, or substantially so, upon the shaft C, and these are designed to catch and hold the teeth in a straight line, when the machine is working as a rake, to rake up the hay in windrows. The teeth or their coils on or around the shaft C are loose, and only restrained from hanging loosely on said shaft by these pins or screws 1 2—the former, as above stated, to hold them in a straight line for raking up the hay into windrows, and the latter to allow them to swing into a spiral line when acting as tedders, in which condition the machine works easier and with less strain, as some and only a portion of the teeth are working at the same time. On a shaft, s, hung in pivoted arms t connected to the upper portion of the main frame, said shaft extending clear across the machine or frame, there is hung a series of clearers, u, which clearers are made of bent wire like the rake or tedder-teeth, and hung loosely upon said shaft by their bends or rings, and are restrained from moving longitudinally on said shaft by pins or otherwise, and upon the ends of these wires are fastened pieces of wood, leather, or other elastic material v to prevent them from wearing or battering the teeth c. As the rake or rather tedder-teeth or arms c are revolved by the rotation of their shaft, they strike against and carry up with themselves the clearers u, throwing the latter up against the cross-bar G' of the frame, which rebounds them or throws them down again; but while thus thrown up the tedder-teeth c pass from under them or slide from under them, and thus the clearers push off any grass that may cling to the teeth c, which, if not removed, would wind around the shaft C and clog and stop the machine, but which by my clearers is obviated entirely. On the side of the main frame there is arranged a sliding piece, w, Figs. 1, 2, 3, which at its lower end is forked, at x, so as to straddle a flattened portion, y, of the shaft C and hold said shaft from turning when its pinions or spurs b are thrown out of mesh with geared rim a, and when the teeth on said shaft are arranged for and acting as a rake; and when the machine is thus arranged to act as a rake, the clearers not being then necessary, the spring-catch t' is detached from the arms t carrying the shaft s, and said arms, shaft, and clearers may be swung out of the way, as shown in Fig. 2, where the machine is represented as arranged for raking up the hay; and when it is to be reset for tedding the parts are shifted, as shown in Figs. 1 and 3, which is but the work of a moment, and then the machine is again a revolving tedder. That the teeth c may have the proper inclinations for both tedding and raking the hay their lower ends have two bends, 3 4, in them—that at 3 for taking and throwing up the hay when it is a tedder, and that at 4 for allowing the teeth to rake and carry forward the hay into windrows. The operator in his seat can change the machine from a tedder to a raker, or vice versa; and in either position or condition he can, by the lever F, raise, lower, or hold the teeth in any desirable working position. When the machine is a tedder it throws up the grass or hay in the direction of the arrow 5; when it is a rake it moves the hay in the direction of the arrow 6. An adjustable weight, K, may be used on the main frame for balancing the raking or tedding apparatus, which is behind the axle, and far enough behind it that it will not be clogged or drag in the hay or grass that the wheels may be on for the time being or passing over. The wheels B B' are represented as being made of metal; they are, however, made of wood, or designed to be so made, with a rim of metal gears or cogs arranged under the fellies, which are broad on the tread and on the inner edges of the rim, as seen in Fig. 1, so as to admit of the pinions b running or working therein. The wheels must be high enough to admit of easy working of the revolving tedders, and if of such necessary height and made of metal they would be too heavy and unwieldy for their purposes; and I therefore propose to make them of wood and the usual tires and metal internal-cogged rims, as shown in the drawing, set near their inner perimeters, and by inner I mean the edges next the main frame. The machine as represented in Figs. 1 and 3 is arranged as a rotary tedder, the shaft C, with its spirally-arranged pins 2 2, catching and throwing around the teeth c, which otherwise, and without the other series of pins 1, would hang loose on said shaft and not turn with it. The rotation of these teeth c catches, raises up, and turns over the grass or partially-made hay, and the clearers u sweep off any that may cling to the teeth and might otherwise wind on the shaft.

To change the machine from a tedder to a rake, which may be done by the driver sitting in his seat, the lever F may first be moved forward and secured to the arc n; next the lever g is moved forward and fastened in the forward notch of the keeper $h$, which draws the main frame forward and takes the pinions $b$ out of gear with the cogged rim $a$; the piece $w$ is then slid down until its forked end straddles the flat part $y$ of the axle or shaft $c$, which holds said shaft from turning. The clearers may be moved out of the way by swinging forward and downward their shaft $s$, and the machine will then be in the position or condition shown in Fig. 2 and become a rake, the teeth $c$ assuming a straight line by the resistance of the hay upon the forward ends thereof and by the restraint of the series of pins 1 in the shaft C. The machine as a rake is within the control of the driver, through the lever F, who may raise up the teeth to deliver the gathered hay in windrows, let them down, or hold them up or down, as he may elect, or let them float over the surface, accommodating themselves thereto, by hitching up the lever-bolt $o$ and allowing the lever to go free. Instead of the forked piece $w$ for holding the axle C and prevent it from turning while raking up the hay, a bolt or keeper of any other construction may be used. In addition to getting the clearers out of the way the shaft or rod $s$, when moved to and fastened in its lower position, causes the clearer-wires to lock and hold the rake-teeth, should they get "hung" or become loose from dropping out of line and place when the same are raised for dumping the hay into windrows. The clearer-wires in this latter position are also made to serve in the place of longer rake-teeth.

The tedder or rake-teeth, as the case may be, can be hung loose on the shaft, or, what is perhaps better, may be lightly sprung on and held by the friction of their own wires, until brought against their respective stops, by coming in contact with the grass or ground, or they may be fastened by any of a number of simple devices in one position, and released and moved into the other by the operator.

Instead of making the two prongs of each of the teeth out of one piece of wire by bending it is a stronger way to let the main wire form the rake-teeth, and to weld onto it the shorter prong that forms the tedder-teeth or tooth.

When cheapness of construction is a primary object, and only then, I make each tooth with one curved prong instead of two. When the teeth are all made in this way, to convert the machine from the tedder to the rake form the operator must move the pinions out of gear, leave his seat, loosen and shove back the caps of the boxes of the shaft C, take out said shaft and replace it with the ends reversed. In this case the rod carrying the clearer-wires is moved as before described, but the wires themselves are left inside of the shaft C, when the same is reversed and replaced, instead of lying over and outside of said shaft; but the lower ends of these clearers are on the outside of the rake-teeth, locking and preventing them from being raised by the pressure of raking, while at the same time they are not allowed to drop by the straight line of studs now on the under side.

The spring $k$, (coiled or in other form,) instead of operating from the shaft $i$, can operate from the main axle connecting the driving-wheels, or can operate on said axle, being in this last case fastened to the main frame G. This will allow the operator's seat to be placed further back, as the spring does not lift upward on the thills, to be counterbalanced by his weight; and this spring can be made adjustable, if desired.

The clearers $u$, instead of being hinged, can be made to slide in guides, and at the same time slide on the teeth. By the words "spiral line," into which the tedder-teeth are thrown, I mean any irregular line, or other than a straight line.

Having thus fully described my invention, what I claim therein as new, and desire to secure by Letters Patent, is—

1. I claim, in combination with the shaft C, which is capable of being rotated or not, as the case may be, a series of teeth movable thereon, and a series of screws, pins, or other stops, 1 and 2 2, thereon, arranged to carry or adjusted to hold said teeth out of line either in regular or irregular order around said shaft when the machine is operated as a tedder, and to hold them in line when acting as a rake, substantially as and for the purpose described.

2. I also claim, in combination with the series of clearers, which are caught and thrown up by the tedder-teeth in their rotation, the stop G' for restraining their upward motion and rebounding them upon the tedder-teeth, as and for the purpose described.

3. I also claim, in combination with a series of clearers that work in connection with a series of transposable tedder and rake teeth, the shaft $s$ for carrying said clearers into either of two positions, the one facilitating tedding the other raking, substantially as described.

4. I also claim the combination of the lever F, locking-bolt $o$, arc $n$, and adjustable stops $p$, or their mechanical equivalents for holding, regulating, or allowing the main frame free motion within the limits of said stops as the machine is advanced or drawn over the ground, and as the driver in his seat may elect or prefer, or as the nature of the ground may require.

STUART PERRY.

Witnessed by
  JOHN G. BARRY,
  HENRY B. KEELER.

(77)